March 17, 1953 C. W. OTTE 2,631,621
AUTOMATIC MACHINE FOR TURNING WOOD HEELS
Filed Jan. 23, 1951 4 Sheets-Sheet 1

INVENTOR.
Charles W. Otte
BY
Murray, Sackhoff + Murray
ATT'YS

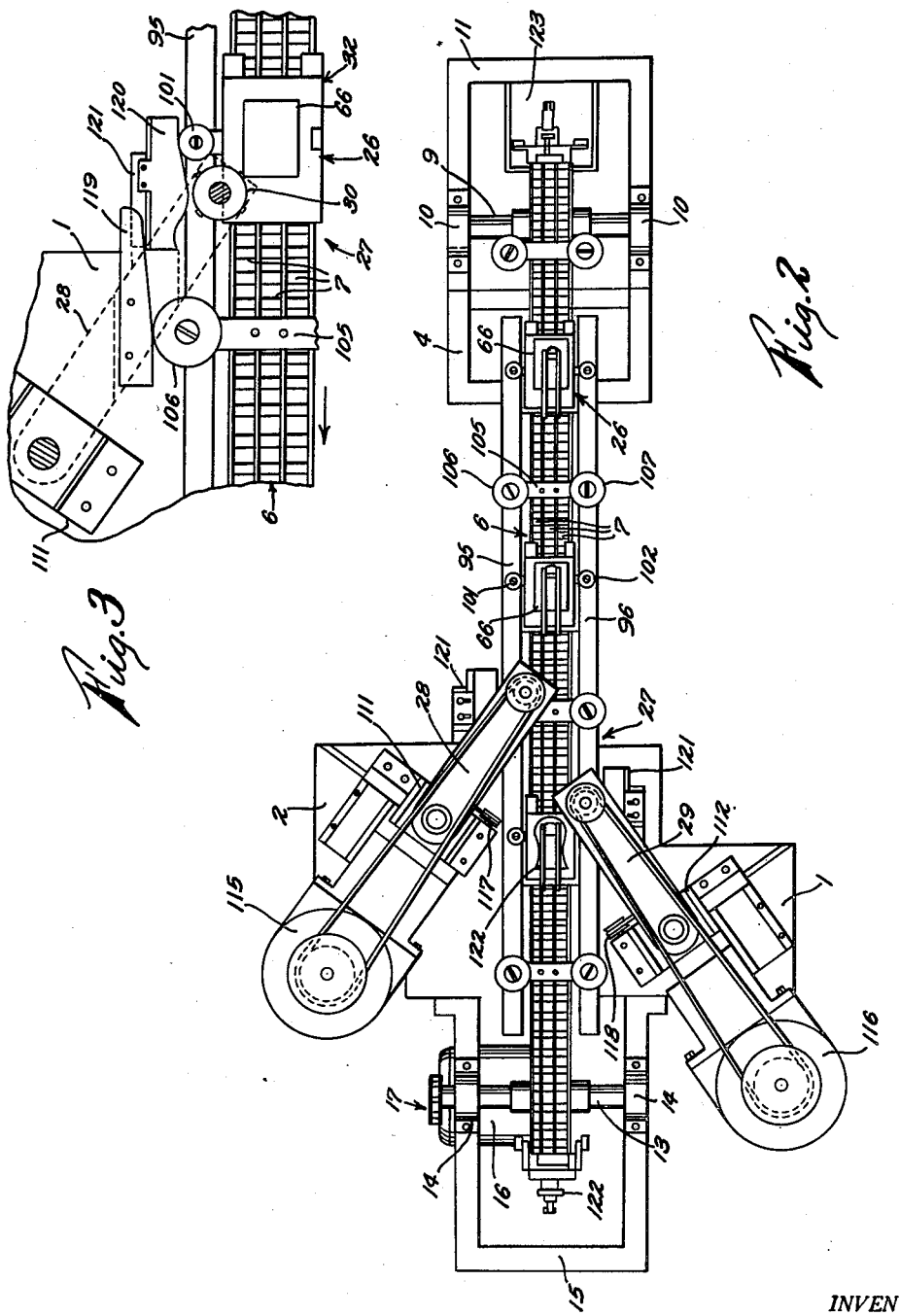

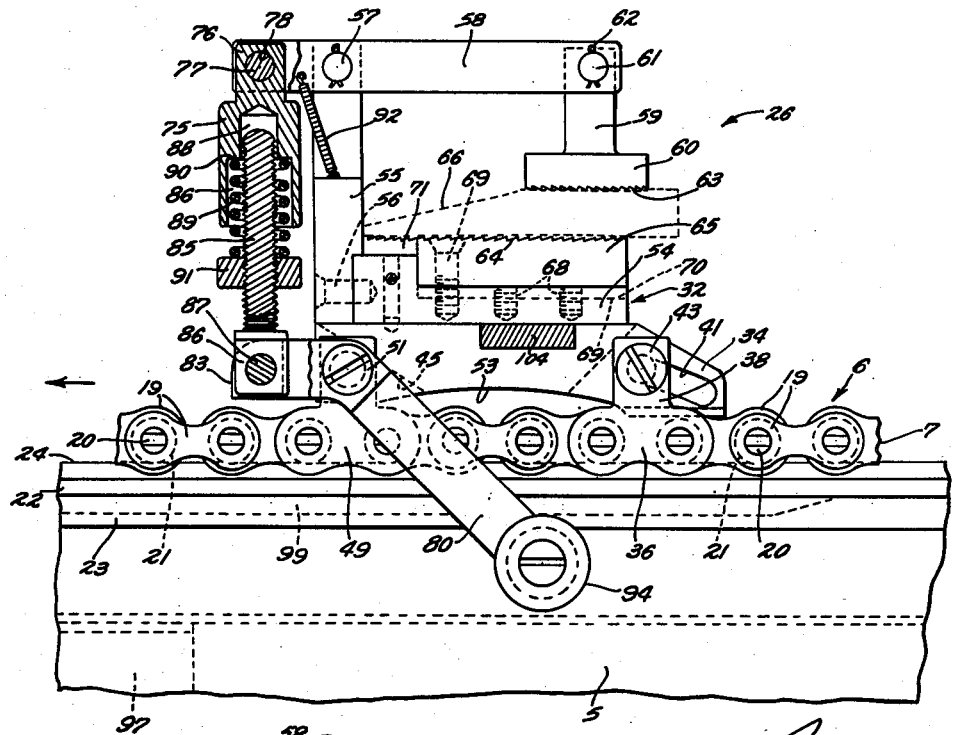
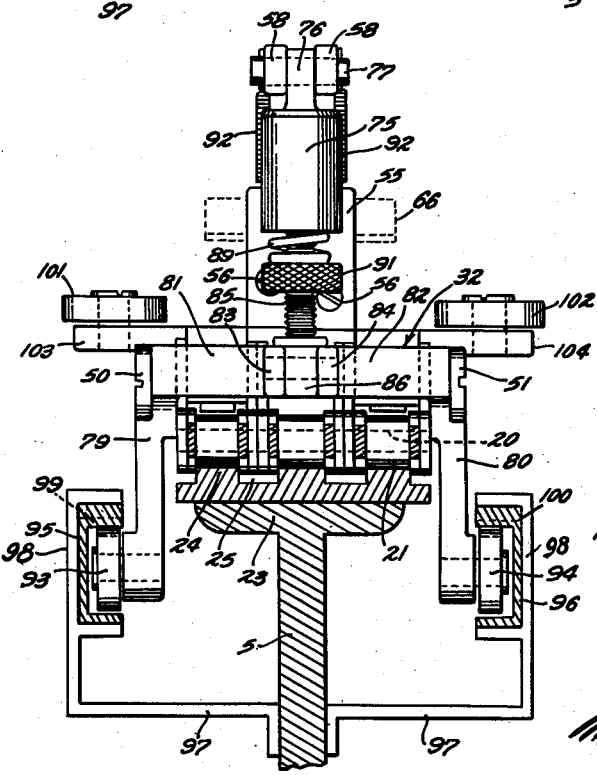

March 17, 1953  C. W. OTTE  2,631,621
AUTOMATIC MACHINE FOR TURNING WOOD HEELS
Filed Jan. 23, 1951  4 Sheets-Sheet 4

INVENTOR.
Charles W. Otte
BY
Murray, Sachhoff & Murray
ATT'YS

UNITED STATES PATENT OFFICE 2,631,621

AUTOMATIC MACHINE FOR TURNING WOOD HEELS

Charles W. Otte, Cincinnati, Ohio, assignor to Vulcan Corporation, Cincinnati, Ohio, a corporation of Ohio Application January 23, 1951, Serial No. 207,380

5 Claims. (Cl. 144—245)

This invention relates to automatic machines for turning wood heels for shoes and is particularly directed to an improved carrier and jack arrangement for passing blanks through the forming stations of said machines.

An object of the invention is to provide a means which makes practical the use of an endless sprocket chain as the expedient for supporting and moving heel blanks through automatic wood heel machines.

Another object of the invention is to provide an improved and greatly simplified machine for manufacturing wood heels, including sprocket chain actuated jacks which have associated with their clamping devices a means for stabilizing the chain upon its track during the time that said jacks carry wood heels through a cutting zone of the machine.

A further object of the invention is to provide a jack for a wood heel machine having a single cam actuated member to effect a heel blank clamping action and which coacts with certain conveyor parts to hold down that portion of the chain conveyor that carries said jack through the heel blank cutting devices of the machine.

Another object of the invention resides in the specific arrangement of jack and conveyor parts which provide in an automatic machine a simplified and effective means for carrying a blank through a heel forming operation in a firm and stable manner to preclude vibration of the blank and/or chatter of the cutters as the said blanks are moved against them.

With these and other objects in view the invention resides in the particular provision and operation of parts hereinafter fully described and illustrated in the accompanying drawings in which:

Fig. 2 is a top plan view of the machine shown in Fig. 1.

Fig. 3 is an enlarged, fragmentary plan view of a cutting zone for the machine depicted in Figs. 1 and 2, showing the relationship between a cutter device and the heel shaping patterns mounted on said device for coaction with rollers carried by the machine conveyor.

Fig. 4 is a side view of a heel jack and certain coacting parts of the jack conveyor, parts being broken away and other parts shown in section.

Fig. 5 is a front elevational view of the heel jack, the conveyor parts being shown in cross section.

Briefly in the practice of my invention I provide a plurality of jacks mounted in spaced relationship upon an endless chain belt conveyor and movable thereby through a heel cutting or shaping zone, said jacks each having a means for releasing and clamping a wood heel blank and means associated with the clamping means and certain conveyor parts to stabilize that portion of the chain belt that carries its loaded jack through the said cutting zone.

Figure 1:
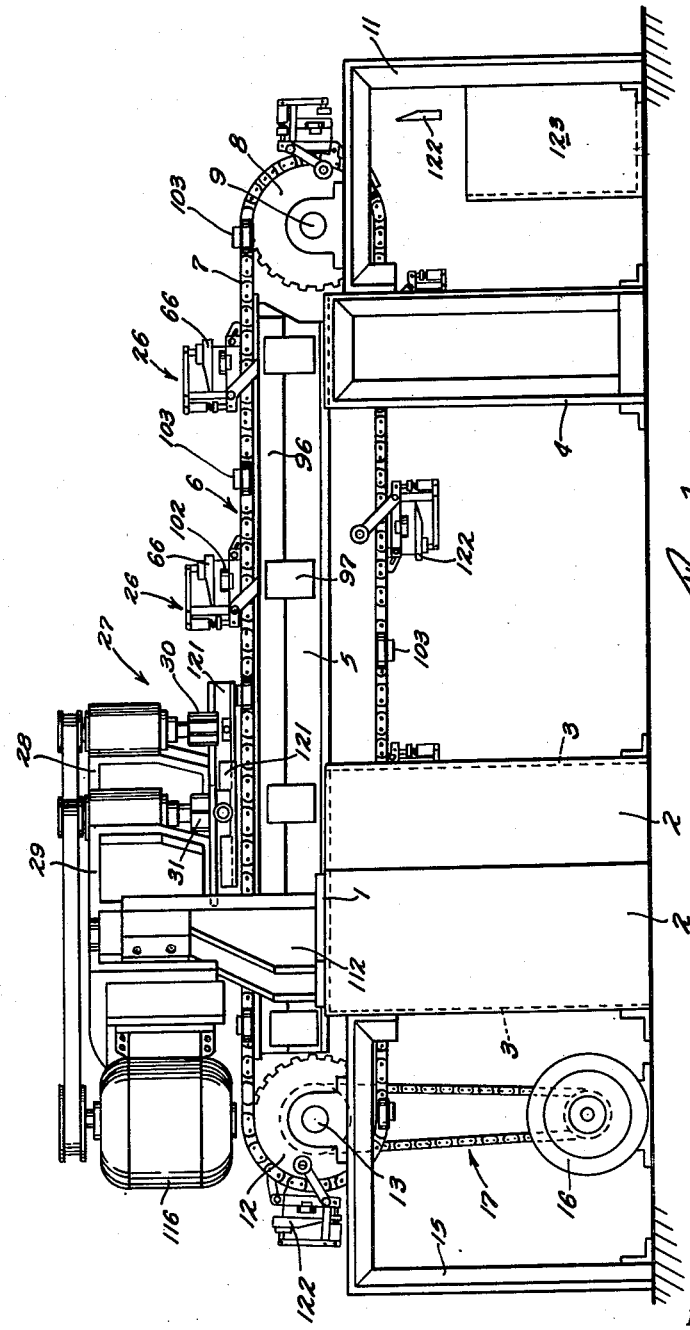
Fig. 1 is a side elevational view of an automatic heel turning machine embodying the features of my invention.

With particular reference to Figs. 1 and 2 of the drawings the numeral 1 indicates a main table supported upon side plates 2—2 and end plates 3—3, whilst numeral 4 refers to a forward machine frame, said frame 4 and table 1 sustaining a longitudinal I-beam 5 between them that serves as a structural member for supporting the upper reach 6 of a chain belt conveyor shown in the drawing as a triple strand roller chain 7. The chain 7 engages a triple strand sprocket 8 at the loading or forward end of the machine, said sprocket being mounted on a shaft 9 journaled at its ends in a pair of laterally spaced bearings 10—10 that are supported upon an extension 11 of the frame 4. A corresponding sprocket 12 engages the opposite end of the triple strand roller chain, said sprocket being fixed on a shaft 13 that is journaled in a pair of spaced bearings 14—14 mounted on a table extension member 15. The said sprocket 12 is driven by a motor 16 suitably mounted beneath the conveyor and connected to the shaft for said sprocket by a chain and sprocket arrangement generally indicated by the numeral 17. The motor is therefore adapted to rotate the three annular rows of teeth in the triple strand sprocket 12 in unison so that they drive the three strands of the roller chain simultaneously in the same direction and at the same speed.

As best shown in Figs. 4 and 5 each chain strand 7 comprises the usual spaced series of overlapping links 19—19 connected together by pivot pins 20 that pass through all the strands, said pins carrying rollers 21 of smaller diameter than the link widths that are confined on their respective pins against axial movement by the spaced series of links. The I-beam has a conveyor track member 22 secured by welding, or the like, to its upper flange 23, said track being coextensive with the beam and disposed between and in line with the uppermost extensions of the opposed group of sprocket wheels 8 and 12. A number of laterally spaced, roller engaging rails 24 are formed in the track member 22 preferably by milling spaced, longitudinal grooves 25 therein, the number and lateral extent of the rails corresponding exactly with the number and lateral dimensions of the rollers, whilst the grooves are of a width to receive the series of links respectively to thereby preclude lateral displacement of the conveyor and track and permit free longitudinal rolling movement of the chains upon said rails.

An endless series of longitudinally spaced apart, wood heel jacks 26 is mounted upon the chain belt, the jacks being successively moved thereby through a heel forming zone 27 (Figs. 1, 2 and 3) defined by two horizontally swinging arms 28 and 29 carrying cutters 30 and 31 respectively. The general features and functions of these cutter arms and the coaction of heel patterns fixed on said arms with certain pattern engaging rollers on the conveyor for controlling the heel shaping movements of the arms is set forth in Patent No. 2,405,941 granted August 20, 1946, and only a brief description of the features of the present wood heel forming zone will be set forth hereinafter.

Figure 6:
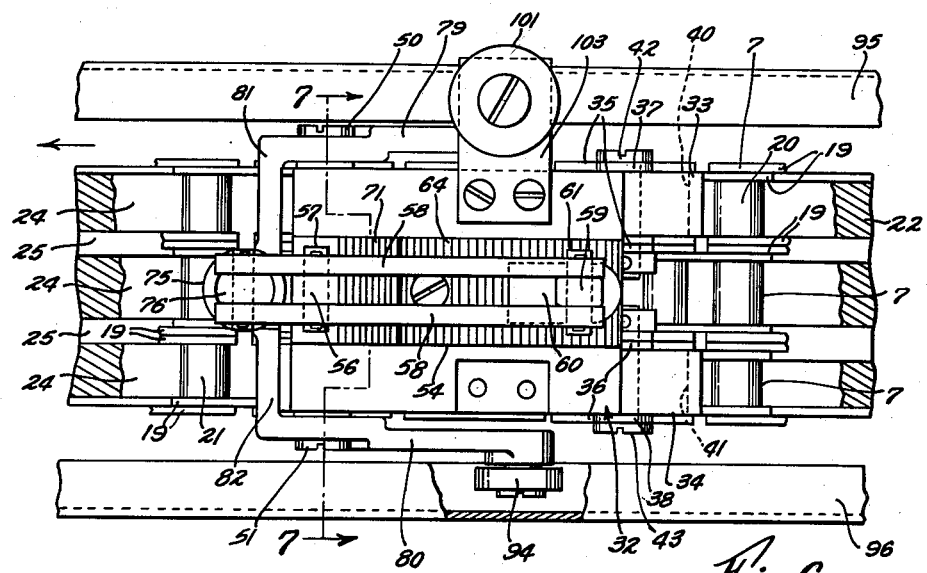
Fig. 6 is a top plan view of the heel jack, the conveyor parts being broken away and one part shown in section.
Figure 7:
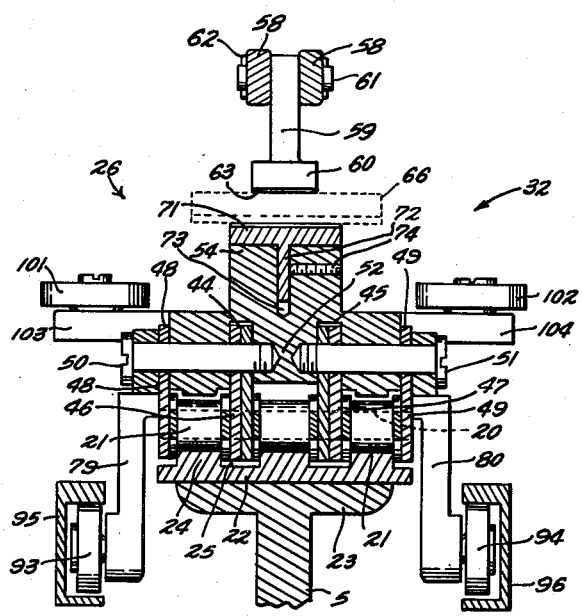
Fig. 7 is a section taken on line 7—7 of Fig. 6.

With respect to the novel conveyor and wood heel jack arrangement of this invention, all of said jacks are identical in structure and functions and a description of one of said jacks will suffice to provide a clear understanding of said arrangement. With reference to Figs. 4–7 inclusive the numeral 32 indicates a jack block generally rectangular in plan that has two laterally spaced arms 33 and 34 extending rearwardly therefrom. These arms are mounted on the chain belt by special chain links 35 and 36 pivotally connected in each strand of the roller chain 7 and having extensions 37 and 38 respectively which embrace the arms. As illustrated in Figs. 4 and 6 the arms 33 and 34 have transversely aligned, arcuate slots 40 and 41 formed therein which slidably receive pivot bolts 42 and 43 respectively which pass through axially aligned bores formed in the link extensions 37 and 38 respectively. The forward end of the jack block is pivotally mounted upon the roller chain 7 by a number of laterally spaced, special chain links depicted in Fig. 7, a pair of centrally located slots 44 and 45 being formed in the block each to receive the upper extension on a pair of links 46 and 47 respectively, whilst special links 48 and 49 embrace the block, all of said links being pivoted to the block by bolts 50 and 51 projecting inwardly into the block in axially aligned relation with their inner ends threaded in a central part 52 of the block that is located between the said slots.

As shown in Fig. 4 the underside of the block is provided with a longitudinally curved bottom surface 53 to conform to the outer diameter of the adjacent chain portion as it passes around the end sprockets so that the block may at all times be maintained close to the chain during machine operation. Slots 40 and 41 provide lost motion between the trailing edge of the jack block and the chain carrier to compensate for extension between the block and chain portion when they are passed around said end sprockets, it being noted in this respect that said slots have arcuate center lines paralleling the curvature of the bottom surface of the jack block.

The center of the block has an integrally formed platform 54 that has a post 55 secured to its forward end by means of countersunk screws 56. This post is reduced laterally at its upper end and has pivoted to said upper end, by pin 57, a pair of rocking levers 58—58. The depressible rearwardly extending and longer ends of the levers carry between their outer ends an arm 59 of a blank clamping foot 60, said arm being pivoted to the levers by a cross pin 61 extending between said arms and fixed thereon against axial displacement by cotter pins 62. The bottom heel blank engaging surface 63 of the foot (Fig. 4) is serrated and coacts with the upper serrated surface 64 of a heel supporting plate 65 to firmly clamp a heel blank 66 therebetween when the jack is in operative condition. The plate is adjustably mounted on the platform in longitudinally selected positions by a countersunk screw 67 that may be threaded in any one of a number of threaded bores 68 formed in the bottom of a key way 69 milled in the platform that is adapted to receive a central key 70 depending from the bottom of the plate. An adaptor heel supporting plate 71 is mounted on the forward end of the platform 54 for vertical adjustment independent of the plate 65 by a shank 72 slidably received in a bore 73 formed in the platform, said adaptor being fixed in adjusted position by a set screw 74.

The shorter ends of the levers 58—58 extend forwardly of the fulcrum pin 57 and have pivoted to their ends a socket member 75, said socket member having a reduced upper end 76 located between the lever ends and connected thereto by a pivot pin 77 that passes through a bore 78 formed in said reduced end.

As best shown in Fig. 4 the means for actuating the jack comprises a pair of rockable operating levers 79—80 mounted on the outer ends of the bolts 50 and 51 respectively which are threaded in the jack block. The levers have inturned upper ends 81 and 82 respectively, each provided with an inner, longitudinal projection 83 and 84 which are spaced apart and have pivotally mounted between them an upstanding threaded lug 85. The lug has an enlarged head 86 having a lateral bore therein to receive the central portion of a pin 87 that is fixed at its ends against axial movement in the projections 83 and 84. The upper end of the lug is snugly received in a bore 88 (Fig. 4) of relatively small diameter formed in the socket member 75, the major intermediate part of the lug passing through a relatively large bore 86 in the member which houses the upper end of a clamping spring 89. The spring encircles the lug and bears at its upper end against a shoulder 90 formed in the socket member between the said bores. The lowest coil of the spring 85 bears against a nut 91 threaded for vertical adjustment on the lug 85. A pair of relatively light contractile springs 92—92 extend between the short arms of levers 58—58 and the post 55 and serve to lightly bias the jack parts toward their open, unloaded positions.

The conveyor hold down and jack clamp operating means for the machine comprises the depressible, lower depending ends of the jack operating levers 79 and 80, each having journaled at its lower end a cam following roller 93—94 respectively. The rollers are carried through longitudinal camming members that take the form of two opposed, inwardly opening channels 95—96 mounted on and coextensive with the I-beam 5. A number of longitudinally spaced brackets 97 serve as a convenient mounting means for said channels, said brackets being welded to the central web of the I-beam and having U-shaped outer ends 98 embracing spaced apart portions of the channels (Fig. 5). As best shown in Figs. 4 and 5 the upper flange of each channel 95—96 has a camming surface 99 and 100 respectively which function to depress the cam rollers 93 and 94 in unison and place the spring 89 under operative compression which operates the jack clamp to hold a heel blank therein. The camming surfaces extend along the entire lengths of the channels except for a short distance at the heel blank loading end of the machine where the jacks must remain in open, inoperative conditions until a heel blank has been inserted therein.

Each of the jacks carry a pair of opposed, transversely extending pattern cam engaging rollers 101—102 each mounted on an arm 103—104 respectively secured to the central portion of the jack block. Interspaced between adjacent jacks is a bar 105 (Figs. 1 and 2) secured to the triple strand roller chain by bolts, or the like, and extending laterally beyond the sides of the chain. The bar extensions have mounted thereon rollers 106—107 respectively that serve to return the cutter tools to operative cutting position after each successive cutting operation is performed on heel blanks passed through the cutting zone on the conveying jacks.

With reference to Figs. 1 and 2 of the drawing the numeral 27 refers to the cutting zone for the machine, said zone having the two horizontally swinging arms 28 and 29 pivotally mounted on vertical standards 111—112 that are anchored on the table and disposed on opposite sides of the chain conveyor. As most clearly shown in Fig. 2 the cutter arms extend at an angle into the path of the heel jacks carried by the conveyor, and it will also be noted that the swinging arm 28 is in an advanced position with respect to arm 29 and the direction of movement of the chain belt. Each arm 28—29 has journaled in its outer end a vertical spindle which has fixed to its lower end the cutters 30 and 31 respectively, said spindles being driven through pulleys and belts by motors 115—116 mounted on brackets carried by the standards. The arms are urged toward the conveyor by gravity actuated weights (not shown) secured to the ends of pull ropes 117 and 118 that are connected to the arms.

In Fig. 3 there is shown a cam 119 fixed to the swinging arm 28 and adapted to contact the roller 106 as it is moved through the cutting zone 27 to swing the arm outwardly away from the conveyor and position said arm and the cutter carried thereby in the initial cutting position. Just as the said cam 119 positions the cutting arm in its initial cutting position roller 101 on the jack block 32 contacts the leading edge of a pattern 120, removably secured on a bracket 121 on the swinging arm 28, said pattern then controlling the movement of the arm 28 so that the cutter 30 will describe a forming movement adapted to form half the side of the blank from the front edge to the center of the back of the blank. After the particular jack leaves the cutter 30 it is moved past the cutter 31 and similar cams and patterns on said arm 29 on that side of the machine are operated by the rollers 102 and 107 to form the opposite side of the heel blank from the forward edge to the center of the blank.

My machine is particularly adapted to turn the outside face of a wood heel for a so-called "platform shoe" on blanks which may or may not have the upper seat and bottom surfaces preformed. In operation the motors 115 and 116 for driving the cutters 30 and 31 are kept in continuous operation. Also the motor 16 continuously drives the chain belt 6 to successively move heel jacks carried thereby through the cutting zone 27. Blanks 66 are manually inserted in each heel jack at the loading station which is located above the frame 4 for the machine. Loading is done by locating the blanks between clamping feet 60 and heel supporting plates 65 of the jacks as they successively move along the loading zone. As each jack is moved by the roller chain 6 in a direction away from the sprocket 8 to and upon the rails 24 the jack hold down and jack operating rollers 93 and 94 are entered into the forward ends of camming channels 95 and 96 and after moving a short distance past the loading zone said rollers are simultaneously depressed by camming surfaces 99 and 100 respectively which place the spring 89 under compression which in turn actuates the clamp and provides stabilizing forces for the chain conveyor whilst the jack is moved through the cutting zone. Upon leaving the channels 95 and 96 at the discharge end of the machine the jack although in open, inoperative condition continues to support the finished work 122 until the jack has traveled along the lower conveyor reach and starts its upward movement around sprocket 8 toward its loading position at which time the heel falls by gravity into a hopper 123.

When the jacks are in clamped positions it will be noted that the levers 79 and 80 for each jack are depressed by the camming surfaces 99 and 100 of the channels 95 and 96 respectively and that the foot 60 is forced down upon the heel supporting block. The heel supporting block transmits said clamping force to the jack block 32 and hence to the triple strand roller chain to force said roller chain down upon the conveyor track 24. The spring 89 is made for relatively heavy duty and is adapted to effectively hold the jack down upon the track and clamp the heel blank to the jacks to prevent chattering or vibration of the jack whilst it carries a heel blank through the cutting zone. The spring also functions to preclude vibration by reason of worn bearing surfaces in the chain, chain mounting and jack clamp mechanism and also compensates for varying thicknesses of heel blocks placed in the jack because the thicker heel blocks require greater stability when moved against the forming cutters and such blocks will compress the spring to a greater extent and place it under greater compression, such force being transmitted by the depressible levers 58—58 and the operating levers 79—80.

What is claimed is:

1. In a machine of the character described a fixed rail extending through a forming zone on the machine, an endless roller chain conveyor having an upper reach supported upon the rail, a number of jacks mounted on the conveyor in longitudinal spaced relation, a blank support on each jack, a clamp arm rockably mounted on the jack and having a depressible portion located above and cooperable with the blank support to clamp a blank therebetween, a rockable lever mounted on, and having a depressible portion extending from the side of the jack, an extensible connection between the opposite portions of the arm and lever, spring means for biasing the connection toward extended positions, a cam track paralleling the rail, and a roller follower on the end of the depressible portion of the lever for engaging in the cam track, said follower being located below the plane of the chain and in vertical alignment with the blank support for the jack.

2. In a machine according to claim 1 characterized by the fact that a rockable lever is located on each side of the jack and said levers are pivotally mounted thereon for unitary movement around a common axis, that a cam track parallels each side of the rail, and that each lever has a follower thereon in engagement with its respective cam track.

3. In a machine according to claim 2 further characterized by the fact that each jack comprises a block pivotally mounted at one end on laterally spaced apart links of the chain conveyor, and the opposite end of the block is mounted on laterally spaced apart links which have a lost motion connection with the said block end.

4. In a machine of the character described a fixed rail extending into and through a forming zone on the machine, an endless roller chain providing an upper conveyor reach supported upon, and having rolling contact with the fixed rail, a number of jacks mounted upon the upper reach of the chain conveyor in longitudinal spaced relation, a depressible blank clamp on each jack, a depressible member mounted on, and extending from each jack, cam follower on the free end portion of the member, a spring connection between the member and the clamp, and a fixed cam track paralleling the rail for engaging the cam followers to successively depress the lever on each jack as it is moved into and through the forming zone of the machine to operate the blank clamps, said spring connections being effective to secure the respective blanks in the jacks and to hold the jacks and their subjacent conveyor portions down upon the rail under a jack stabilizing, yieldable pressure of the spring connection.

5. In a machine of the character described a fixed rail extending into and through a forming zone on the machine, an endless roller chain conveyor having an upper reach supported by, and in rolling contact with the fixed rail, a number of jacks mounted upon the conveyor reach in longitudinal spaced relation, a compressible blank clamp on each jack, a depressible clamp operating member mounted on, and extending from each jack, a resilient connection between the member and the blank clamp, a cam track parallel to and coextensive with the rail, and a cam follower on each clamp operating member adapted to engage the track to operate the blank clamp and to hold the jack and its subjacent conveyor portion down upon the rail as the jack is moved by the chain conveyor into and through the forming zone of the machine.

CHARLES W. OTTE.

REFERENCES CITED

The following references are of record in the file of this patent:

UNITED STATES PATENTS

| Number | Name | Date |
| --- | --- | --- |
| 1,412,910 | Whipple | Apr. 18, 1922 |
| 1,496,539 | Hudson | June 3, 1924 |
| 1,689,459 | Small | Oct. 30, 1928 |
| 2,346,039 | Montague | Apr. 4, 1944 |